(12) United States Patent
Gopalan (10) Patent No.: US 11,347,816 B2
(45) Date of Patent: May 31, 2022

(54) ADAPTIVE CLUSTERING OF MEDIA CONTENT FROM MULTIPLE DIFFERENT DOMAINS

(71) Applicant: AT&T Intellectual Property I, L.P., Atlanta, GA (US)

(72) Inventor: Raghuraman Gopalan, Dublin, CA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 751 days.

(21) Appl. No.: 15/829,155

(22) Filed: Dec. 1, 2017

(65) Prior Publication Data

US 2019/0171765 A1  Jun. 6, 2019

(51) Int. Cl.
*G06F 16/9535* (2019.01)
*G06F 16/43* (2019.01)
*G06F 16/55* (2019.01)

(52) U.S. Cl.
CPC .......... *G06F 16/9535* (2019.01); *G06F 16/43* (2019.01); *G06F 16/55* (2019.01)

(58) Field of Classification Search
CPC ....... G06F 16/9535; G06F 16/55; G06F 16/43
USPC .................................. 707/722, 737
See application file for complete search history.

(56) References Cited

U.S. PATENT DOCUMENTS

| | | | | |
|---|---|---|---|---|
| 5,953,076 | A * | 9/1999 | Astle | G06T 7/246 348/580 |
| 6,516,099 | B1 * | 2/2003 | Davison | G06T 7/33 382/284 |
| 7,139,328 | B2 | 11/2006 | Thomas et al. | |
| 7,620,019 | B1 | 11/2009 | Smith et al. | |
| 7,724,961 | B2 | 5/2010 | Porikli et al. | |
| 7,996,390 | B2 * | 8/2011 | Freire | G06F 16/35 707/722 |
| 8,116,566 | B2 | 2/2012 | Kirby et al. | |
| 8,315,323 | B2 | 11/2012 | Liu et al. | |
| 8,620,971 | B2 | 12/2013 | Tanaka et al. | |
| 8,787,469 | B2 | 7/2014 | Kim et al. | |

(Continued)

FOREIGN PATENT DOCUMENTS

WO   2010087782 A2   8/2010

OTHER PUBLICATIONS

David G. Lowe. "Distinctive Image Features from Scale-Invariant Keypoints". Jan. 5, 2004. International Journal of Computer Vision 2004. pp. 1-28 (Year: 2004).*

(Continued)

*Primary Examiner* — Michael Pham (57) ABSTRACT

In one example, the present disclosure describes a device, computer-readable medium, and method for adaptively clustering media content from multiple different domains in the presence of domain shift. For instance, in one example, a plurality of data content items is acquired from a plurality of different domains, wherein at least some data content items of the plurality of data content items are unlabeled. The plurality of data content items is encoded with a feature representing a domain shift variation that is assumed to be present in the plurality of data content items, wherein the domain shift variation comprises variation in a characteristic of the plurality of data content items. The plurality of data content items is clustered into a predefined number of content categories subsequent to the encoding.

20 Claims, 6 Drawing Sheets

(56) References Cited

U.S. PATENT DOCUMENTS

| | | | |
|---|---|---|---|
| 8,965,893 | B2 | 2/2015 | Cvet et al. |
| 8,972,407 | B2 | 3/2015 | Nagano et al. |
| 8,990,125 | B2 | 3/2015 | Raichelgauz et al. |
| 8,990,199 | B1 | 3/2015 | Ramesh et al. |
| 9,088,447 | B1 | 7/2015 | Koike-Akino et al. |
| 9,471,944 | B2 | 10/2016 | Burger et al. |
| 9,495,439 | B2 | 11/2016 | Xi et al. |
| 9,495,618 | B1 | 11/2016 | Tabb |
| 9,672,217 | B2 | 6/2017 | Raichelgauz et al. |
| 9,697,280 | B2 | 7/2017 | Maharajh et al. |
| 9,710,729 | B2 | 7/2017 | Chidlovskii et al. |
| 10,832,166 | B2 * | 11/2020 | Bhatt ............... G06K 9/624 |
| 2007/0250468 | A1 * | 10/2007 | Pieper ............ G06F 16/9535 |
| 2012/0221498 | A1 | 8/2012 | Kaszynski et al. |
| 2013/0304818 | A1 | 11/2013 | Brumleve et al. |
| 2014/0310280 | A1 | 10/2014 | Mccaleb et al. |
| 2015/0310309 | A1 * | 10/2015 | Gopalan ........... G06K 9/6267 382/199 |
| 2016/0078359 | A1 * | 3/2016 | Csurka ............. G06K 9/6215 706/12 |
| 2016/0253597 | A1 * | 9/2016 | Bhatt ............... G06N 20/00 706/12 |
| 2017/0147944 | A1 * | 5/2017 | Csurka ............... G06N 3/02 |
| 2018/0211303 | A1 * | 7/2018 | Chatwin ........... G06F 16/951 |
| 2018/0218284 | A1 * | 8/2018 | Jawahar ........... G06N 3/0454 |
| 2018/0314982 | A1 * | 11/2018 | Gopalan ............ G06N 20/00 |
| 2019/0171765 | A1 * | 6/2019 | Gopalan ............ G06F 16/43 |
| 2019/0325299 | A1 * | 10/2019 | Oliveira Pinheiro .... G06N 3/08 |

OTHER PUBLICATIONS

Mirrashed, Fatemeh et al. "Domain Adaptive Classification". 2013. IEEE. 2013 IEEE International Conference on Computer Vision. pp. 2608-2615 (Year: 2013).*

Gopalan et al. "Domain Adaptation for Object Recognition: An Unsupervised Approach". 2011. IEEE Conference on Computer Vision, pp. 999-1006. (Year: 2011).*

Gopalan et al. "Unsupervised Adaptation Across Domain Shifts by Generating Intermediate Data Representations". Nov. 2014. IEEE Transactions on Pattern Analysis and Machine Intelligence, vol. 36. No. 11. pp. 2288-2302 (Year: 2014).*

J. Hoffman, T. Darrell and K. Saenko, "Continuous Manifold Based Adaptation for Evolving Visual Domains," 2014 IEEE Conference on Computer Vision and Pattern Recognition, 2014, pp. 867-874, doi: 10.1109/CVPR.2014.116. (Year: 2014).*

V. M. Patel, R. Gopalan, R. Li and R. Chellappa, "Visual Domain Adaptation: A survey of recent advances," in IEEE Signal Processing Magazine, vol. 32, No. 3, pp. 53-69, May 2015, doi: 10.1109/MSP.2014.2347059. (Year: 2015).*

Ho et al., "Model-driven domain adaptation on product manifolds for unconstrained face recognition", International Journal of Computer Vision vol. 109 Issue 1-2 (2014). pp. 110-125. https://pdfs.semanticscholar.org/a397/16f1785cfdc4ba0e49e7d3374b5234c602a1.pdf.

Farseev et al., "Cross-domain recommendation via clustering on multilayer graphs", Proceedings of the 40th International ACM SIGIR Conference on Research and Development in Information Retrieval. ACM (2017). 10 Pages. https://pdfs.semanticscholar.org/3c78/ada32da2aac0ef2e23d16e786c24efd8b2a3.pdf.

Zahavy et al., "Is a picture worth a thousand words? A Deep Multi-Modal Fusion Architecture for Product Classification in e-commerce", arXiv preprint arXiv: 1611.09534 (2016). 10 Pages. https://arxiv.org/pdf/1611.09534.pdf.

Castrejón et al., "Learning aligned cross-modal representations from weakly aligned data", Proceedings of the IEEE Conference on Computer Vision and Pattern Recognition (2016). pp. 2940-2949. https://www.cv-foundation.org/openaccess/content_cvpr_2016/papers/Castrejon_Learning_Aligned_Cross-Modal_CVPR_2016_paper.pdf.

Comaniciu et al., "Mean shift: A robust approach toward feature space analysis", IEEE Transactions on Pattern Analysis and Machine Intelligence vol. 24 Issue 5 (2002). pp. 603-619. http://cyrille.nathalie.free.fr/computer%20vision/color%20segmentation/comanici/Papers/MsRobustApproach.pdf.

Wang et al., "Low rank representation on Grassmann manifolds", Asian Conference on Computer Vision, Springer International Publishing (2014). 16 Pages. http://ai2-s2-pdfs.s3.amazonaws.com/40c6/a4462fa545f23403a39bd7cd6ab9cd62e667.pdf.

* cited by examiner

ADAPTIVE CLUSTERING OF MEDIA CONTENT FROM MULTIPLE DIFFERENT DOMAINS

The present disclosure relates generally to the classification of media content, and relates more particularly to devices, non-transitory computer-readable media, and methods for classifying and clustering media content from multiple different domains or sources in the presence of domain shift.

BACKGROUND

Operators of content distribution networks provide customers with access to media content of various different types (e.g., images, videos, audio, etc.). Moreover, the media content may originate from various different domains (e.g., different content providers, as in the case of a World Wide Web search that pulls results from multiple web feeds).

SUMMARY

In one example, the present disclosure describes a device, computer-readable medium, and method for adaptively clustering media content from multiple different domains in the presence of domain shift. For instance, in one example, a plurality of data content items is acquired from a plurality of different domains, wherein at least some data content items of the plurality of data content items are unlabeled. The plurality of data content items is encoded with a feature representing a domain shift variation that is assumed to be present in the plurality of data content items, wherein the domain shift variation comprises variation in a characteristic of the plurality of data content items. The plurality of data content items is clustered into a predefined number of content categories subsequent to the encoding.

In another example, a device includes a processor and a computer-readable medium storing instructions which, when executed by the processor, cause the processor to perform operations. The operations include acquiring a plurality of data content items from a plurality of different domains, wherein at least some data content items of the plurality of data content items are unlabeled, encoding the plurality of data content items with a feature representing a domain shift variation that is assumed to be present in the plurality of data content items, wherein the domain shift variation comprises variation in a characteristic of the plurality of data content items, and clustering the plurality of data content items into a predefined number of content categories subsequent to the encoding.

In another example, a non-transitory computer-readable storage medium stores instructions which, when executed by a processor, cause the processor to perform operations. The operations include acquiring a plurality of data content items from a plurality of different domains, wherein at least some data content items of the plurality of data content items are unlabeled, encoding the plurality of data content items with a feature representing a domain shift variation that is assumed to be present in the plurality of data content items, wherein the domain shift variation comprises variation in a characteristic of the plurality of data content items, and clustering the plurality of data content items into a predefined number of content categories subsequent to the encoding.

BRIEF DESCRIPTION OF THE DRAWINGS

The teachings of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

In one example, the present disclosure performs adaptive clustering of media content from multiple different domains in the presence of domain shift (i.e., variations in features of the media content due to the different domains from which the media content originates). As discussed above, operators of content distribution networks provide customers with access to media content of various different types (e.g., images, videos, audio, etc.). Moreover, the media content may originate from various different domains (e.g., different content providers), which can introduce domain shift in the media content. As such, it may be a challenge to accurately group the media content into groups or categories of related content. This challenge is exacerbated when the media content is unlabeled (as is often the case), since the lack of evidence as to how the domain shift may have affected the groups or categories makes it difficult to precisely account for the domain shift.

Examples of the present disclosure adaptively cluster media content, at least some of which may be unlabeled, into categories of related content. Thus, examples of the present disclosure may be considered "unsupervised." Examples of the disclosure obtain a pool of media content coming from an unknown number of different domains, where at least some of the media content is unlabeled. Each individual item of media content is assumed to relate to one of a predefined, fixed number of different, predefined content categories. Examples of the present disclosure then generate clusters of the media content, such that items of media content belonging to the same category are clustered together, regardless of the domain(s) from which the items of media content come. In one example, clustering is facilitated by encoding the media content in a way that allows the effects of domain shift to be reduced.

Within the context of the present disclosure, "domain shift" is understood to refer to variations in features or characteristics of media content due to the different domains from which the media content may originate. For instance, when analyzing images from different domains, domain shift variations in the images might include variations in viewpoint, illumination, affine transformations, blur, resolution, occlusion, and the like. Thus among a set of related images acquired from different domains, such as a set of images of human faces, the illumination, resolution, viewpoint, and the like may vary over the set of related images (e.g., some facial images may have better illumination than others, some facial images may depict the face straight-on while other facial images depict the face from slightly above or below, some faces in the images may be partially occluded, etc.). This may make clustering the related images together more challenging, as discussed above. Although examples of the disclosure are discussed within the context of clustering images, the same concepts may be applied to cluster any type of media content for which domain shift variations may be present. Thus, the examples of the present disclosure could also be used to cluster video, audio, and other types of media content.

Figure 1:
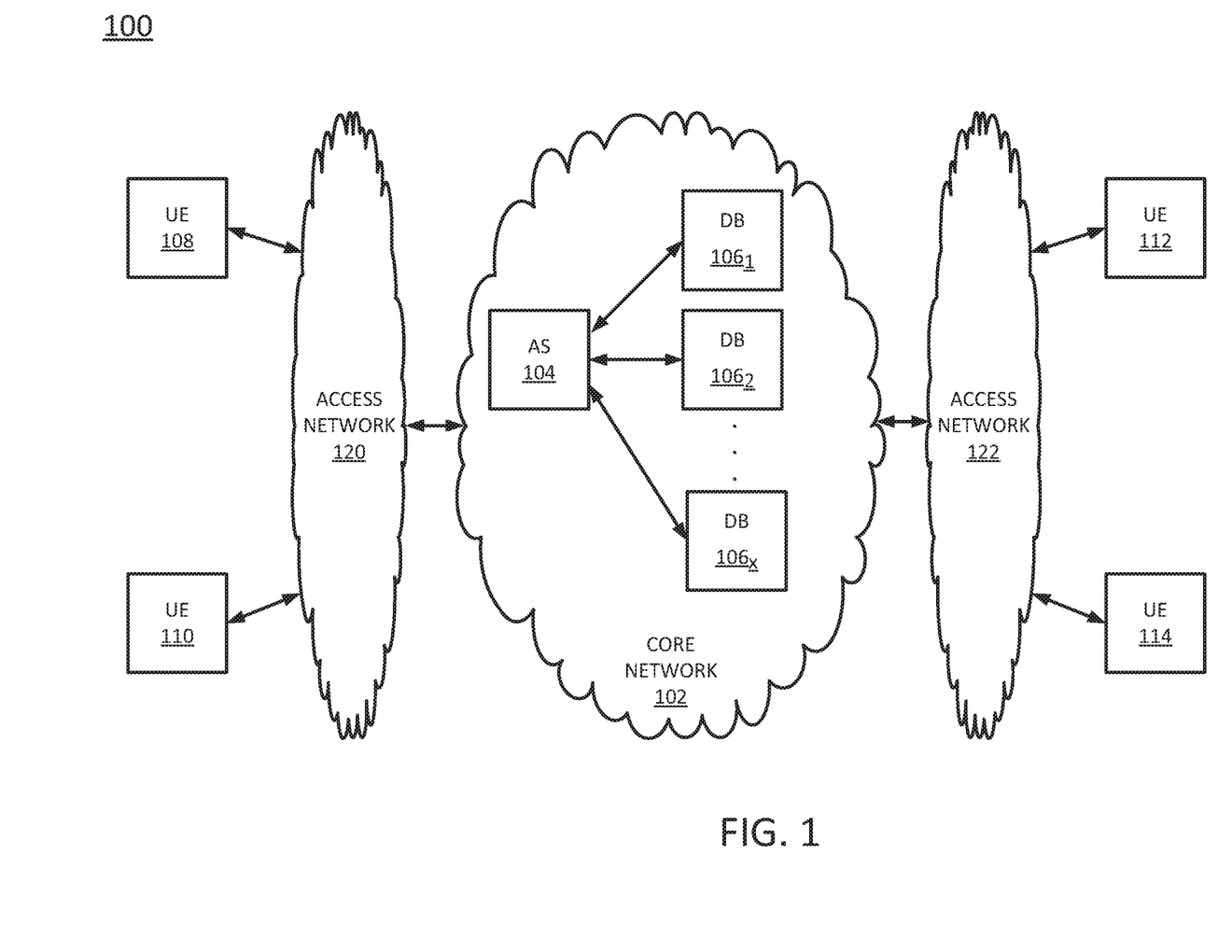
FIG. 1 illustrates an example network, related to the present disclosure.

To better understand the present disclosure, FIG. 1 illustrates an example network 100, related to the present disclosure. The network 100 may be any type of communications network, such as for example, a traditional circuit switched network (CS) (e.g., a public switched telephone network (PSTN)) or an Internet Protocol (IP) network (e.g., an IP Multimedia Subsystem (IMS) network, an asynchronous transfer mode (ATM) network, a wireless network, a cellular network (e.g., 2G, 3G and the like), a long term evolution (LTE) network, and the like) related to the current disclosure. It should be noted that an IP network is broadly defined as a network that uses Internet Protocol to exchange data packets. Additional exemplary IP networks include Voice over IP (VoIP) networks, Service over IP (SoIP) networks, and the like.

In one embodiment, the network 100 may comprise a core network 102. In one example, core network 102 may combine core network components of a cellular network with components of a triple play service network; where triple play services include telephone services, Internet services, and television services to subscribers. For example, core network 102 may functionally comprise a fixed mobile convergence (FMC) network, e.g., an IP Multimedia Subsystem (IMS) network. In addition, core network 102 may functionally comprise a telephony network, e.g., an Internet Protocol/Multi-Protocol Label Switching (IP/MPLS) backbone network utilizing Session Initiation Protocol (SIP) for circuit-switched and Voice over Internet Protocol (VoIP) telephony services. Core network 102 may also further comprise an Internet Service Provider (ISP) network. In one embodiment, the core network 102 may include an application server (AS) 104 and a database (DB) 106. Although only a single AS 104 and a single DB 106 are illustrated, it should be noted that any number of application servers and databases may be deployed. Furthermore, for ease of illustration, various additional elements of core network 102 are omitted from FIG. 1, including switches, routers, firewalls, web servers, and the like.

The core network 102 may be in communication with one or more wireless access networks 120 and 122. Either or both of the access networks 120 and 122 may include a radio access network implementing such technologies as: global system for mobile communication (GSM), e.g., a base station subsystem (BSS), or IS-95, a universal mobile telecommunications system (UMTS) network employing wideband code division multiple access (WCDMA), or a CDMA3000 network, among others. In other words, either or both of the access networks 120 and 122 may comprise an access network in accordance with any "second generation" (2G), "third generation" (3G), "fourth generation" (4G), Long Term Evolution (LTE), or any other yet to be developed future wireless/cellular network technology including "fifth generation" (5G) and further generations. The operator of core network 102 may provide a data service to subscribers via access networks 120 and 122. In one embodiment, the access networks 120 and 122 may all be different types of access networks, may all be the same type of access network, or some access networks may be the same type of access network and other may be different types of access networks. The core network 102 and the access networks 120 and 122 may be operated by different service providers, the same service provider or a combination thereof.

In one example, the access network 120 may be in communication with one or more user endpoint devices (also referred to as "endpoint devices" or "UE") 108 and 110, while the access network 122 may be in communication with one or more user endpoint devices 112 and 114.

Figure 8:
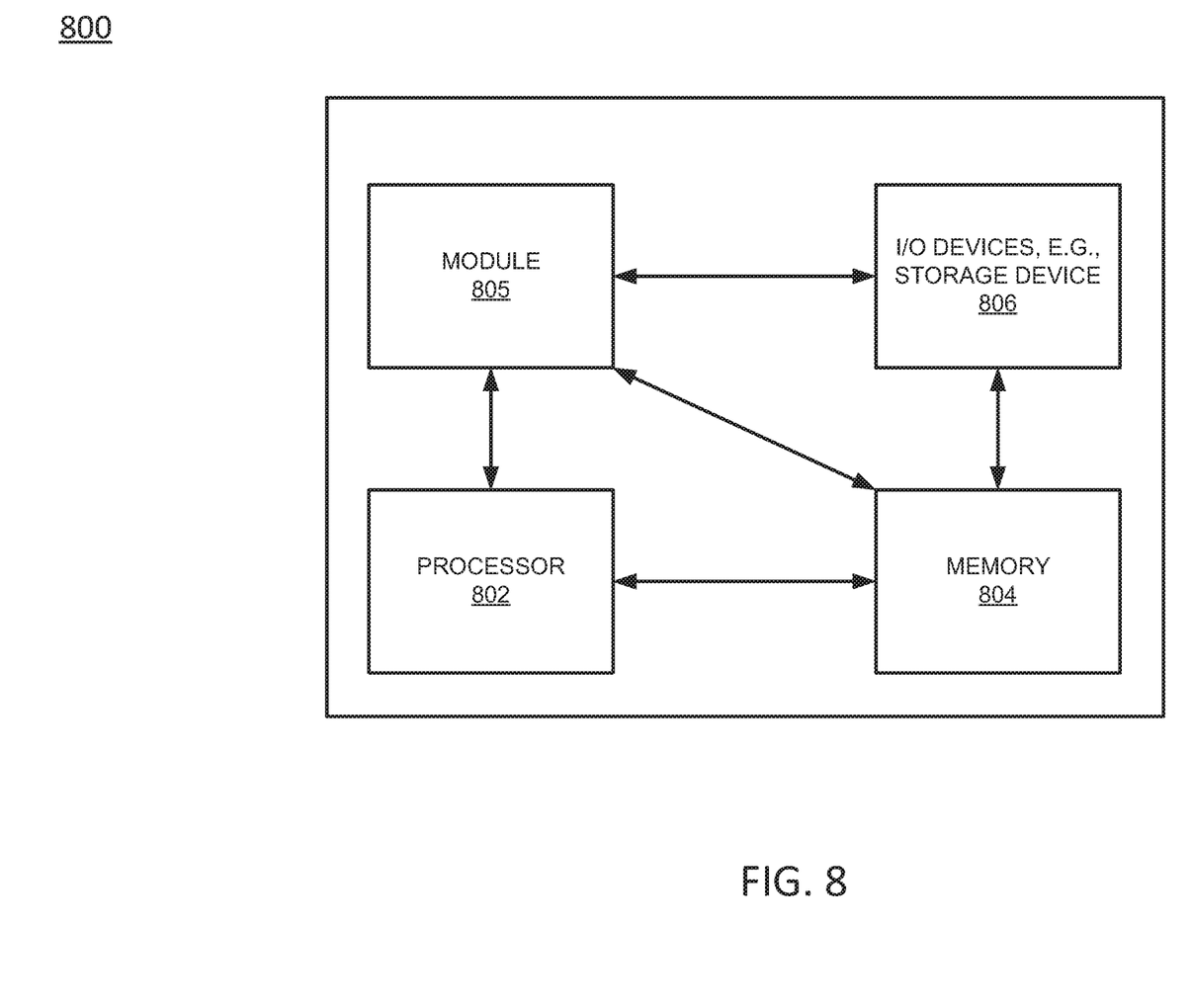
FIG. 8 depicts a high-level block diagram of a computing device specifically programmed to perform the functions described herein.

In one example, the user endpoint devices 108, 110, 112, and 114 may be any type of subscriber/customer endpoint device configured for wireless communication such as a laptop computer, a Wi-Fi device, a Personal Digital Assistant (PDA), a mobile phone, a smartphone, an email device, a computing tablet, a messaging device, a wearable "smart" device (e.g., a smart watch or fitness tracker), a portable media device (e.g., an MP3 player), a gaming console, a portable gaming device, a set top box, a smart television, a connected vehicle, and the like. In one example, at least some of the UEs 108, 110, 112, and 114 are configured to monitor metrics that help track a user's physical activity. In one example, any one or more of the user endpoint devices 108, 110, 112, and 114 may have both cellular and non-cellular access capabilities and may further have wired communication and networking capabilities (e.g., such as a desktop computer). It should be noted that although only four user endpoint devices are illustrated in FIG. 1, any number of user endpoint devices may be deployed. Any of the UEs 108, 110, 112, or 114 may comprise a general purpose computer that is configured to operate as a special purpose computer, as illustrated in FIG. 8 and discussed below. In one example, any of the UEs 108, 110, 112, or 114 may perform the methods discussed below related to regulating access to electronic devices and services.

In one example, the AS 104 performs the methods discussed below related to adaptively clustering media content from multiple different domains in the presence of domain shift. For instance, in one example, the AS 104 may host an application, such as a search engine, that communicates with one or more of the UEs 108, 110, 112, and 114. The AS 104 may further host an application that communicates with one or more databases (DBs) $106_1$-$106_x$ (hereinafter collectively referred to as "databases 106" or "DBs 106") and that adaptively clusters media content items acquired from these databases 106. The AS 104 may comprise a general purpose computer as illustrated in FIG. 8 and discussed below.

In one example, the DBs 106 may store media content items such as images, video, audio, and the like. Each DB of the DBs 106 may be representative of a different domain or source of media content. Thus, there may be some variation (domain shift) in the features of the media content that is spread across the DBs 106, as discussed above.

It should also be noted that as used herein, the terms "configure" and "reconfigure" may refer to programming or loading a computing device with computer-readable/computer-executable instructions, code, and/or programs, e.g., in a memory, which when executed by a processor of the computing device, may cause the computing device to perform various functions. Such terms may also encompass providing variables, data values, tables, objects, or other data structures or the like which may cause a computer device executing computer-readable instructions, code, and/or programs to function differently depending upon the values of the variables or other data structures that are provided.

Those skilled in the art will realize that the network 100 has been simplified. For example, the network 100 may include other network elements (not shown) such as border elements, routers, switches, policy servers, security devices, a content distribution network (CDN) and the like. The network 100 may also be expanded by including additional endpoint devices, access networks, network elements, application servers, etc. without altering the scope of the present disclosure.

Figure 2:
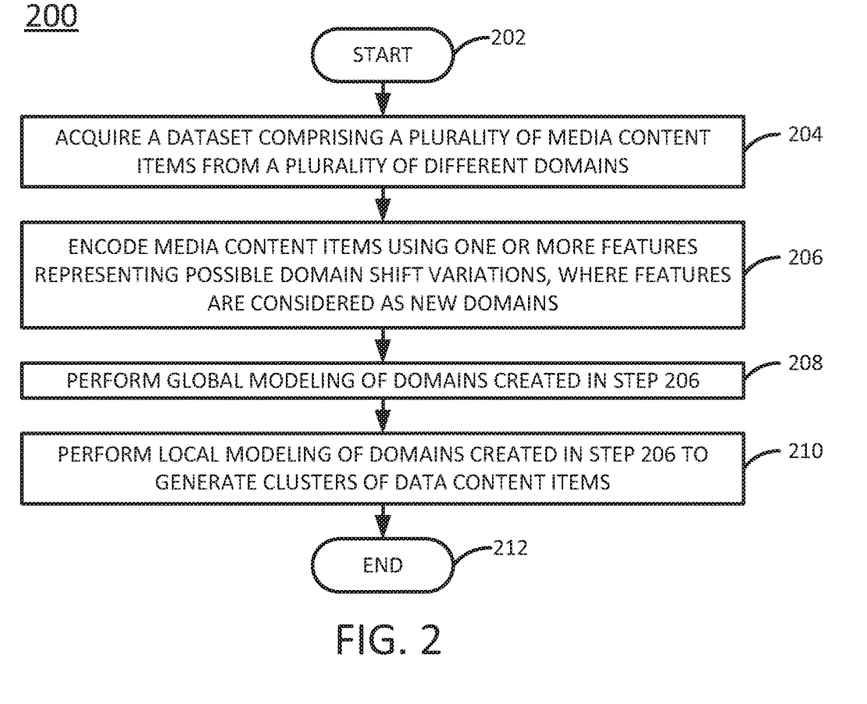
FIG. 2 illustrates a flowchart of a first example method for adaptively clustering media content from multiple different domains in the presence of domain shift.

To further aid in understanding the present disclosure, FIG. 2 illustrates a flowchart of a first example method 200 for adaptively clustering media content from multiple different domains in the presence of domain shift. In one example, the method 200 could be performed by an application server, such as AS 104 of FIG. 1. Although the discussion of the method 200 may make reference to operations carried out by the AS 104, such references are made for the sake of example and are not intended to limit the means by which the method 200 may be performed.

The method 200 begins in step 202. In step 204, a dataset comprising a plurality of media content items (e.g., images, video, audio, etc.) from a plurality of different domains is acquired. In one example, at least some of the media content items are unlabeled. In further examples, all of the media content items may be unlabeled. Furthermore, in some examples, the number of domains from which the dataset is acquired is unknown. When the dataset is acquired, the types of domain shift variations that are present in the dataset are also unknown. However, some possible causes for the domain shift variations may be known.

In step 206, the media content items are encoded using one or more features that represent possible domain shift variations that are assumed to be present (or possibly present) in the media content items. This provides the clustering process with some robustness to known domain shift patterns. In one example, where the media content items comprise images, encoding of the media content items includes performing at least one of histogram equalization, self-quotient image computation, image deconvolution, and local phase quantized codebook extraction. Performing histogram equalization on the dataset allows for extraction of scale-invariant feature transform (SIFT) codebook features which provide robustness to lighting, scale, and rotation variations. Computing the self-quotient image from the dataset allows for the extraction of SIFT codebook features which provide additional robustness to non-linear lighting variations. Performing image deconvolution on the dataset allows for the extraction of speeded-up robust features (SURF) codebook features which provide robustness to blur and rotation variations. Extracting local phase quantized codebooks from the dataset provides robustness to blur, lighting, and partial occlusion variations. Each of these encoding techniques may be considered as an individual "simulated" domain containing different feature descriptions of the original media content items. The dimension of the codebooks across all of these simulated domains may be set to be the same.

In step 208, global (e.g., domain-level) modeling of the simulated domains created in step 206 is performed. Global modeling combines the information contained across domains, thereby allowing real domain shift to be addressed more effectively on a global level. In one example, global modeling uses subspace geometry tools pertaining to Grassmannian manifold. In one example, for each of the domains created in step 206, a p-dimensional generative sub-space, $S_i$ is generated, e.g., by performing principal component analysis (PCA). Each sub-space $S_i$ is a point on the Grassmann manifold $G_{d,p}$, which is the space of all p-dimensional sub-spaces in $R^d$ (where $R^d$ is a d-dimensional Euclidean space). One example of a method for learning how information flows between these points in the Grassman manifold is illustrated and described in greater detail in connection with FIG. 3. One example of a method for learning intrinsic distributions on the Grassman manifold is illustrated and described in greater detail in connection with FIG. 4.

In step 210, local (e.g., data or media content item-level) modeling of the simulated domains created in step 206 is performed. Local modeling translates learned information regarding consolidated bridged information on domain shift onto the individual media content items. Through local modeling, the media content items can be grouped into appropriate categories. In one example, local modeling uses subspace geometry tools pertaining to Grassmannian manifold. The local modeling results in the clustering of the data content items into a number of fixed categories of like content. One example of a method for local modeling is described in greater detail in connection with FIG. 7.

Collectively, the global and local modelling performed in steps 208-210 minimize the impact of domain shift, which ultimately assists in clustering of the media content items as discussed in further detail below.

The method 200 then ends in step 212.

Figure 3:
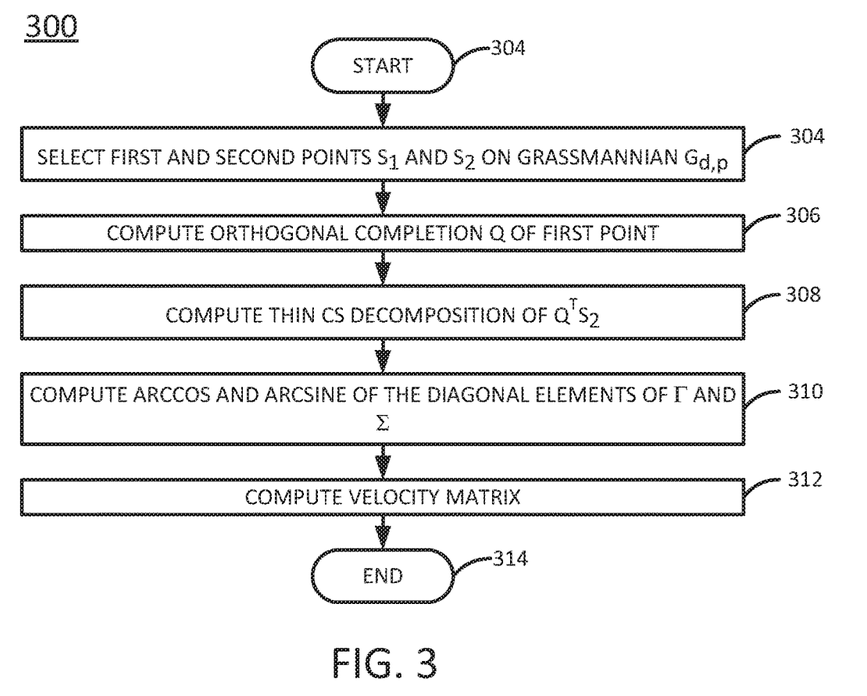
FIG. 3 is a flow diagram illustrating one example of a method for performing global modeling of domains, e.g., in accordance with one or more steps of the method illustrated in FIG. 2.

FIG. 3 is a flow diagram illustrating one example of a method 300 for performing global modeling of domains, e.g., in accordance with step 208 of the method 200. In one example, the method 300 could be performed by an application server, such as AS 104 of FIG. 1. Although the discussion of the method 300 may make reference to operations carried out by the AS 104, such references are made for the sake of example and are not intended to limit the means by which the method 300 may be performed.

In one example, the method 300 learns how information flows between points in the Grassman manifold (i.e., between each sub-space representing a domain) using the notion of the geodesic, which is the shortest path between pairs of points on the manifold. This shows how the partial information conveyed about the domain shift in these points can be combined or bridged. In short, the method 300 considers geodesics between all pairs of points and then samples additional points along those geodesics using the notion of inverse exponential maps.

The method 300 begins in step 302. In step 304, first and second points (e.g., $S_1$ and $S_2$) on the Grassmannian $G_{d,p}$ are selected.

In step 306, the d×d orthogonal completion Q of the first point $S_1$ is computed.

In step 308, the thin CS decomposition of $Q^T S_2$ given by the following is computed:

$$Q^T S_2 = \begin{matrix} X_C \\ Y_C \end{matrix} = \begin{pmatrix} V_1 & 0 \\ 0 & \tilde{V}_2 \end{pmatrix} \begin{pmatrix} \Gamma(1) \\ -\Sigma(1) \end{pmatrix} V^T \qquad (EQN. 1)$$

In step 310, $\{\theta_i\}$ are computed, which are given by the inverse trigonometric function of cosine (arccos) and the inverse trigonometric function of sine (arcsine) of the diagonal elements of $\Gamma$ and $\Sigma$, respectively (i.e., $\gamma_i = \cos(\theta_i)$, $\sigma_i = \sin(\theta_i)$. This forms the diagonal matrix $\Theta$, with $\theta$'s as diagonal elements.

In step 312, the velocity matrix $A = \tilde{V}_2 \Theta V_1^T$ is computed.

The method 300 ends, in step 314. The method 300 may be repeated as necessary for each pair of points on the Grassmannian $G_{d,p}$. Thus, the method 300 considers each point on the Grassmannian $G_{d,p}$ as a weak representation that partially bridges the domain shift of a dataset (e.g., a collection of images from a plurality of different domains).

Figure 4:
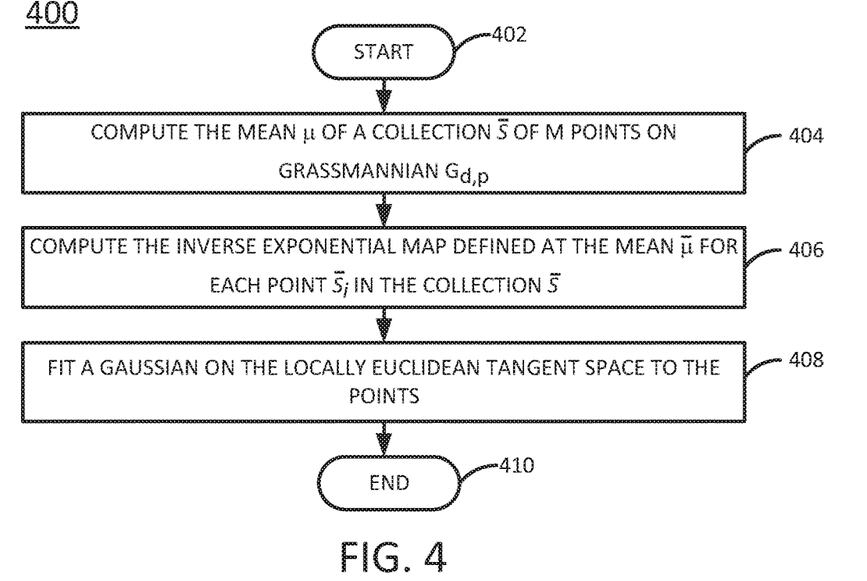
FIG. 4 is a flow diagram illustrating one example of a method for performing global modeling of domains, e.g., in accordance with one or more steps of the method illustrated in FIG. 2.

FIG. 4 is a flow diagram illustrating one example of a method 400 for performing global modeling of domains, e.g., in accordance with step 208 of the method 200. In one example, the method 400 could be performed by an application server, such as AS 104 of FIG. 1. Although the discussion of the method 400 may make reference to operations carried out by the AS 104, such references are made for the sake of example and are not intended to limit the means by which the method 400 may be performed.

In one example, the method 400 learns intrinsic distributions on the Grassmannian $G_{d,p}$ utilizing the tangent space approximation (i.e., a locally Euclidean representation of the non-linear manifold space). Since the Grassmannian is an analytical manifold, there are expressions to compute this approximation using inverse exponential mapping. Thus, the method 400 presents one way of learning a distribution corresponding to a set of points (e.g., sub-spaces). The method 400 assumes a collection $\bar{S}$ of m points, $S_1$-$S_m$, on the Grassmannian $G_{d,p}$.

The method 400 begins in step 402. In step 304, the mean p of the collection $\bar{S}$ of m points is computed. In one example, the mean is computed using the Karcher mean computation illustrated and described in greater detail in connection with FIG. 6.

In step 406, the inverse exponential map defined at the mean $\bar{\mu}$ is computed for each point $\bar{S}_i$ in the collection $\bar{S}$. This obtains the tangent space approximation $\bar{S}'_i$ for each point $\bar{S}_i$.

In step 408, a Gaussian is fitted on the locally Euclidean tangent space to the points $\{\bar{S}'_i\}_{i=1}^m$.

The method 400 ends in step 410. While the method 400 pursues a Gaussian distribution, it should be noted that any other parametric/non-parametric distributions can be fitted. Then, 100 representative points can be randomly sampled from the Gaussian (or other distribution), and their representations on the Grassman manifold can be obtained using exponential mapping to produce the final set of sub-spaces S* that convey the consolidated bridged information on the domain shift (obtained from the simulated domains that are generated in step 206 of the method 200). One example of a method for computing the exponential map and sampling along the geodesic is described and illustrated in greater detail in connection with FIG. 5.

Figure 5:
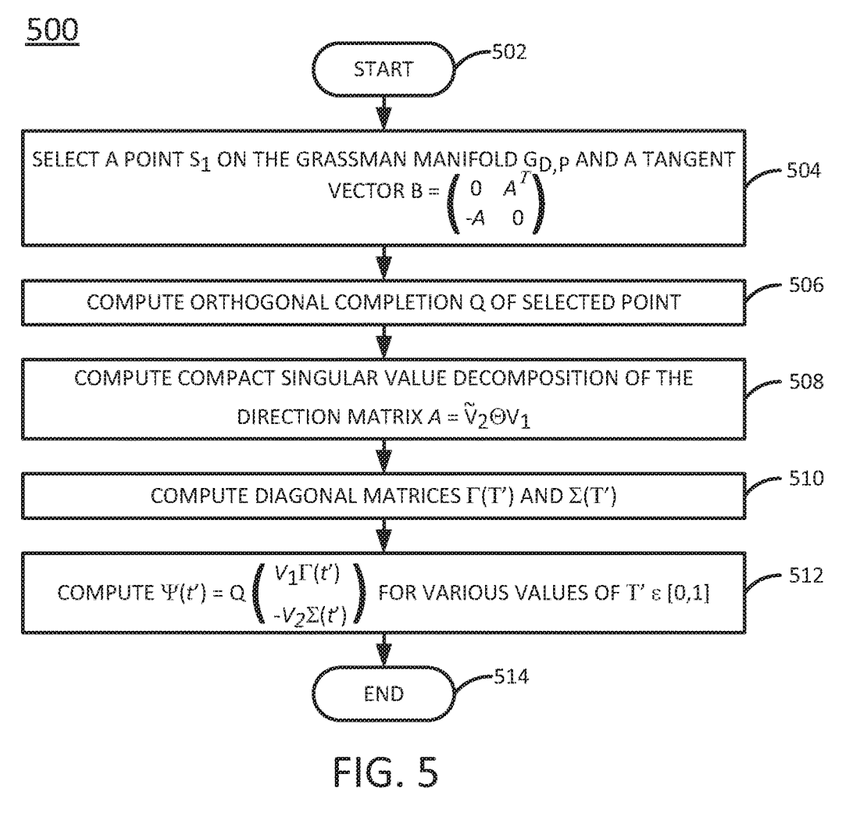
FIG. 5 is a flow diagram illustrating one example of a method for computing an exponential map and sampling along a geodesic.

FIG. 5 is a flow diagram illustrating one example of a method 500 for computing an exponential map and sampling along a geodesic. In one example, the method 500 could be performed by an application server, such as AS 104 of FIG. 1. Although the discussion of the method 500 may make reference to operations carried out by the AS 104, such references are made for the sake of example and are not intended to limit the means by which the method 500 may be performed.

The method 500 begins in step 502. In step 504, a point $S_1$ is selected on the Grassman manifold $G_{d,p}$, and a tangent vector $$B = \begin{pmatrix} 0 & A^T \\ -A & 0 \end{pmatrix}$$

is selected.

In step 506, the d×d orthogonal completion Q of the selected point is computed.

In step 508, the compact singular value decomposition (SVD) of the direction matrix $A = \tilde{V}_2 \Theta V_1$ (e.g., as computed in step 312 of the method 300) is computed.

In step 510, the diagonal matrices $\Gamma(t')$ and $\Sigma(t')$ are computed such that $\gamma_i(t') = \cos(t'\theta_i)$, $\sigma_{i(t')} = \sin(t'\theta_i)$. In this case, $\theta$'s are the diagonal elements of the diagonal matrix $\Theta$.

In step 512, $$\Psi(t') = Q \begin{pmatrix} V_1 \Gamma(t') \\ -V_2 \Sigma(t') \end{pmatrix}$$

is computed for various values of $t' \in [0,1]$.

The method 500 ends in step 514. The method 500 may be repeated any number of times for each or a number of points on the Grassman manifold $G_{d,p}$.

Figure 6:
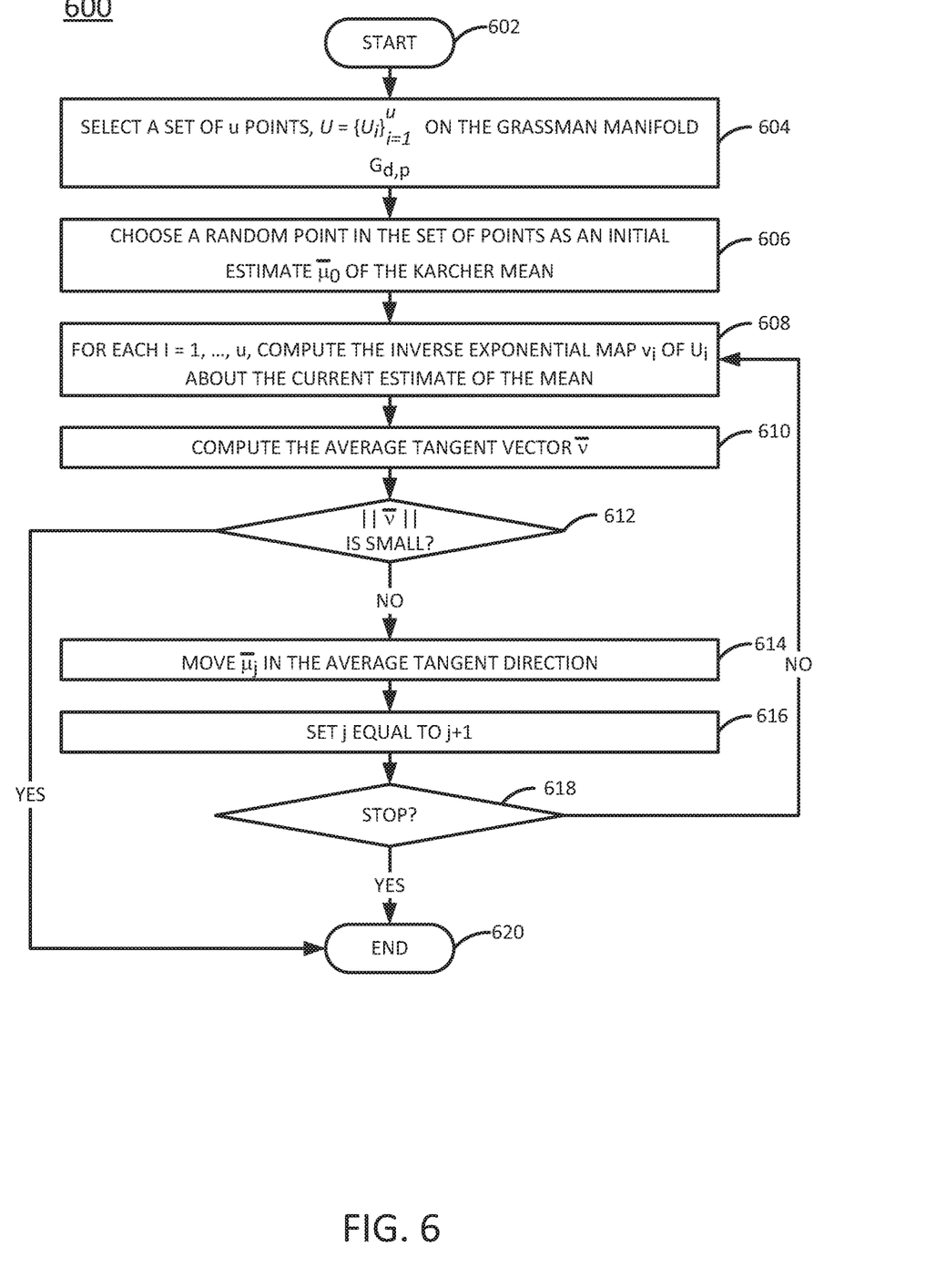
FIG. 6 is a flow diagram illustrating one example of a method for computing a Karcher mean, e.g., in accordance with one or more steps of the method illustrated in FIG. 4.

FIG. 6 is a flow diagram illustrating one example of a method 600 for computing a Karcher mean, e.g., in accordance with step 402 of the method 400. In one example, the method 600 could be performed by an application server, such as AS 104 of FIG. 1. Although the discussion of the method 600 may make reference to operations carried out by the AS 104, such references are made for the sake of example and are not intended to limit the means by which the method 600 may be performed.

The method 600 begins in step 602. In step 604, a set of u points, $U = \{U_i\}_{i=1}^u$ on the Grassman manifold $G_{d,p}$ is selected.

In step 606, a random point in the set of points is chosen as an initial estimate $\bar{\mu}_0$ of the Karcher mean. j is set to zero.

In step 608, for each i=1, ..., u, the inverse exponential map $v_i$ of $U_i$ is computed about the current estimate of the mean. That is, $$v_i = \exp_{\bar{\mu}_j}^{-1}(U_i)$$

is computed for each i=1, ..., u.

In step 610, the average tangent vector $\bar{v}$ is computed as $$\bar{v} = \frac{1}{u} \sum_{i=1}^{u} v_i.$$

In step 612, it is determined whether the absolute value of $\bar{v}$, i.e., $\|\bar{v}\|$ is small. In one example, $\|\bar{v}\|$ is considered to be small if it is within five percent of its immediately previous value.

If $\|\bar{v}\|$ is determined to be small in step 612, then the method 600 ends in step 620. If, however, $\|\bar{v}\|$ is determined not to be small in step 612, then the method 600 continues to step 614.

In step 614, $\bar{\mu}_j$ is moved in the average tangent direction using $\mu_{j+1}=\exp_{\bar{\mu}_j}(\in\bar{v})$, where $\in >0$ is considered to be a small step size (e.g., typically 0.5) and $\exp_{\bar{\mu}_j}$ is the exponential map at $\bar{\mu}_j$.

In step 616, j is set equal to j+1.

In step 618, it is determined whether the method 600 should stop. In one example, the method 600 is set to iterate through steps 608-616 until either $\bar{\mu}_j$ does not change (or does not change by more than a threshold amount) or until a maximum number of iterations is reached. If it determined in step 618 that the method 600 should not stop, then the method 600 returns to step 608. If, however, it is determined in step 618 that the method 600 should stop, then the method 600 ends in step 220.

Figure 7:
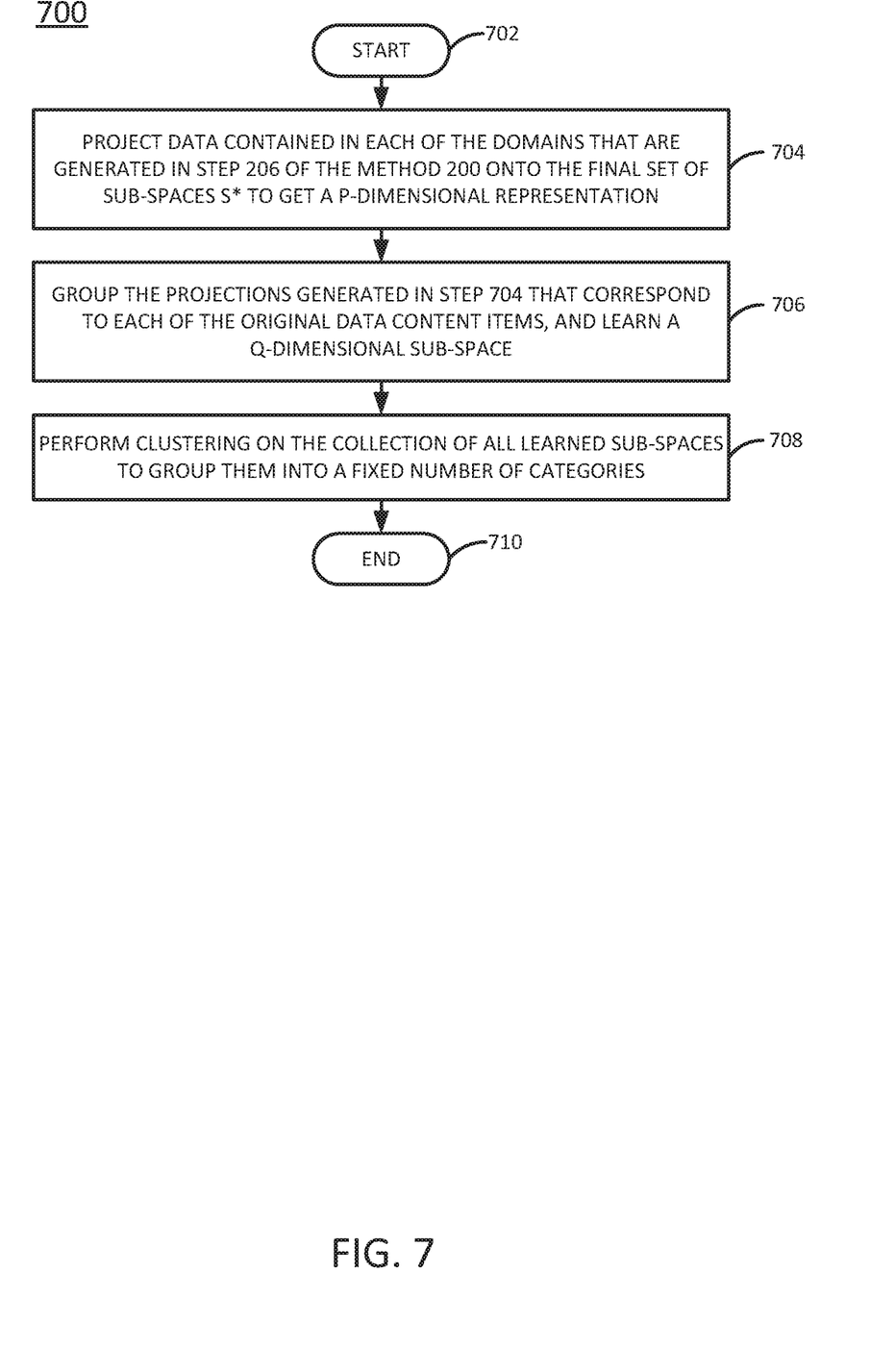
FIG. 7 is a flow diagram illustrating one example of a method for performing local modeling of domains, e.g., in accordance with one or more steps of the method illustrated in FIG. 2.

FIG. 7 is a flow diagram illustrating one example of a method 700 for performing local modeling of domains, e.g., in accordance with step 210 of the method 200. In one example, the method 700 could be performed by an application server, such as AS 104 of FIG. 1. Although the discussion of the method 700 may make reference to operations carried out by the AS 104, such references are made for the sake of example and are not intended to limit the means by which the method 700 may be performed.

In one example, the method 700 translates learned information regarding consolidated bridged information on domain shift (e.g., as contained in a final set of sub-spaces S* described above in connection with FIG. 4) onto the individual media content items.

The method 700 begins in step 702. In step 704, data contained in each of the simulated domains that are generated in step 206 of the method 200 is projected onto the final set of sub-spaces S* to get a p-dimensional representation.

In step 706, the projections generated in step 704 that correspond to each of the original data content items are grouped, and a q-dimensional sub-space is learned, e.g., by performing principal component analysis. For instance, if $T=\{T_i\}_{i=1}^n$ denotes the collection of all learned sub-spaces, then each $T_i$ is a point on the Grassmannian $G_{p,q}$, which is the space of all q-dimensional sub-spaces in $R^p$ (where $R^p$ is a p-dimensional Euclidean space). It is noted that the sub-space dimension q of $T_i$ (and likewise the sub-space p of $S_i$) is determined by a heuristic tied to the number of eigen vectors required to preserve ninety percent of the PCA energy.

In step 708, clustering is performed on the collection of all learned sub-spaces to group them into a fixed number of categories. In one example, the clustering is performed by performing a k-means on the Grassmannian $G_{p,q}$. In this case, the geodesic distance is used on the Grassman manifold (rather than, for instance, the regular $l_2$ distance). More specifically, given the set of sub-spaces (or points) $T=(T_1, T_2, \ldots, T_n)$ on the Grassmannian $G_{p,q}$, step 708 seeks to estimate a fixed number N of clusters, $C=(C_1, C_2, \ldots, C_N)$, with cluster centers $(\mu_1, \mu_2, \ldots \mu_n)$, so that the sum of the geodesic-distance squares $\Sigma_{i=1}^N \Sigma_{T_j \in C_i} \bar{d}^2(T_j,\mu_i)$ is minimized. In this case, $\bar{d}^2(T_j,\mu_i)=|\exp_{\mu_i}^{-1}(T_j)|^2$, where $\exp_{\mu_i}^{-1}$ is the inverse exponential map computed from the tangent plane centered at $\mu_i$. In one example, this problem can be solved using an expectation-maximization (EM)-based approach. For instance, the EM algorithm may be initialized with a random selection of N points as the cluster centers. In the expectation step, each of the points in the set T is assigned to the nearest cluster center. Then, in the maximization step, the cluster centers are recomputed, for example using the Karcher mean approach illustrated and described in connection with FIG. 6.

In step 710, the method 700 ends.

Although not expressly specified above, one or more steps of the methods 200-700 may include a storing, displaying and/or outputting step as required for a particular application. In other words, any data, records, fields, and/or intermediate results discussed in the method can be stored, displayed and/or outputted to another device as required for a particular application. Furthermore, operations, steps, or blocks in FIGS. 2-7 that recite a determining operation or involve a decision do not necessarily require that both branches of the determining operation be practiced. In other words, one of the branches of the determining operation can be deemed as an optional step. Furthermore, operations, steps, or blocks of the above described method(s) can be combined, separated, and/or performed in a different order from that described above, without departing from the examples of the present disclosure.

FIG. 8 depicts a high-level block diagram of a computing device specifically programmed to perform the functions described herein. For example, any one or more components or devices illustrated in FIG. 1 or described in connection with the methods 200-700 may be implemented as the system 800. For instance, an application server could be implemented as illustrated in FIG. 8.

As depicted in FIG. 8, the system 800 comprises a hardware processor element 802, a memory 804, a module 805 for performing adaptive clustering of media content, and various input/output (I/O) devices 806.

The hardware processor 802 may comprise, for example, a microprocessor, a central processing unit (CPU), or the like. The memory 804 may comprise, for example, random access memory (RAM), read only memory (ROM), a disk drive, an optical drive, a magnetic drive, and/or a Universal Serial Bus (USB) drive. The module 805 for performing adaptive clustering of media content may include circuitry and/or logic for performing special purpose functions relating to adaptively clustering of media content from a plurality of different domains. The input/output devices 806 may include, for example, a camera, a video camera, storage devices (including but not limited to, a tape drive, a floppy drive, a hard disk drive or a compact disk drive), a receiver, a transmitter, a speaker, a microphone, a transducer, a display, a speech synthesizer, an output port, or a user input device (such as a keyboard, a keypad, a mouse, and the like).

Although only one processor element is shown, it should be noted that the general-purpose computer may employ a plurality of processor elements. Furthermore, although only one general-purpose computer is shown in the Figure, if the method(s) as discussed above is implemented in a distributed or parallel manner for a particular illustrative example, i.e., the steps of the above method(s) or the entire method(s) are implemented across multiple or parallel general-purpose computers, then the general-purpose computer of this Figure is intended to represent each of those multiple general-purpose computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a general purpose computer or any other hardware equivalents, e.g., computer readable instructions pertaining to the method(s) discussed above can be used to configure a hardware processor to perform the steps, functions and/or operations of the above disclosed method(s). In one example, instructions and data for the present module or process 805 for performing adaptive clustering of media content (e.g., a software program comprising computer-executable instructions) can be loaded into memory 804 and executed by hardware processor element 802 to implement the steps, functions or operations as discussed above in connection with the example methods 200, 300, 400, 500, 600, and/or 700. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 805 for performing adaptive clustering of media content (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

While various examples have been described above, it should be understood that they have been presented by way of example only, and not limitation. Thus, the breadth and scope of a preferred example should not be limited by any of the above-described example examples, but should be defined only in accordance with the following claims and their equivalents.

What is claimed is:

1. A method, comprising:
acquiring, by a processor, a plurality of data content items originating from a plurality of different source domains, wherein each source domain of the plurality of different source domains comprises a different provider of data content, and wherein at least some data content items of the plurality of data content items are unlabeled;
encoding, by the processor, the plurality of data content items with a feature representing a domain shift variation that is assumed to be present in the plurality of data content items, wherein the domain shift variation comprises a variation in a characteristic of the plurality of data content items, wherein an encoding technique performed on the plurality of data content items comprises at least one encoding technique of a plurality of encoding techniques including: histogram equalization, self-quotient image computation, image deconvolution, or local phase quantized codebook extraction, and wherein the encoding results in a plurality of simulated domains, each simulated domain of the plurality of simulated domains resulting from a different encoding technique of the plurality of encoding techniques being performed on the plurality of data content items and containing a different feature description corresponding to a feature extracted by the different encoding technique; and
clustering, by the processor, the plurality of data content items into a predefined number of content categories subsequent to the encoding, wherein at least one content category of the predefined number of content categories includes a subset of the plurality of data content items, and the subset of the plurality of data content items includes data content items acquired from at least two source domains of the plurality of different source domains, such that the clustering results in those of the data content items that belong to a same content category of the predefined number of content categories being clustered together regardless of which source domains of the plurality of different source domains those of the data content items are acquired from.

2. The method of claim 1, wherein a number of the plurality of different source domains is unknown.

3. The method of claim 1, wherein a type of the domain shift variation is unknown.

4. The method of claim 1, wherein the plurality of data content items comprises a plurality of images, and the characteristic comprises an illumination.

5. The method of claim 1, wherein the plurality of data content items comprises a plurality of images, and the characteristic comprises a viewpoint.

6. The method of claim 1, wherein the plurality of data content items comprises a plurality of images, and the characteristic comprises an affine transformation.

7. The method of claim 1, wherein the plurality of data content items comprises a plurality of images, and the characteristic comprises a resolution.

8. The method of claim 1, wherein the plurality of data content items comprises a plurality of images, and the characteristic comprises a blur.

9. The method of claim 1, wherein the plurality of data content items comprises a plurality of images, and the characteristic comprises an occlusion.

10. The method of claim 1, wherein the at least one encoding technique comprises histogram equalization, and the feature is a scale-invariant feature transform codebook feature.

11. The method of claim 1, wherein the at least one encoding technique comprises self-quotient image computation, and the feature is a scale-invariant feature transform codebook feature.

12. The method of claim 1, wherein the at least one encoding technique comprises image deconvolution, and the feature is a speeded-up robust feature codebook feature.

13. The method of claim 1, wherein the at least one encoding technique comprises local phase quantized codebook extraction, and the feature is a local phase quantized codebook feature.

14. The method of claim 1, wherein the plurality of data content items is retrieved from the plurality of different source domains by a search engine application.

15. The method of claim 1, further comprising:
performing global modeling of the plurality of simulated domains by combining information across the plurality of simulated domains; and performing local modeling of the plurality of media content items by translating information learned in the global modeling onto the plurality of media content items.

16. The method of claim 15, wherein the global modeling comprises:
generating a p-dimensional generative sub-space for each simulated domain of the plurality of simulated domains, where each sub-space generated represents a point on a Grassman manifold comprising a space of all p-dimensional sub-spaces.

17. The method of claim 16, wherein the p-dimensional generative sub-space is generated using principal component analysis.

18. The method of claim 16, wherein the local modeling comprises:
projecting data contained in each simulated domain of the plurality of simulated domains onto a set of p-dimensional generative sub-spaces corresponding to the plurality of simulated domains to generate a plurality of projections; and
learning a q-dimensional sub-space via grouping of the plurality of projections.

19. A device, comprising:
a processor; and
a computer-readable medium storing instructions which, when executed by the processor, cause the processor to perform operations, the operations comprising:
acquiring a plurality of data content items originating from a plurality of different source domains, wherein each source domain of the plurality of different source domains comprises a different provider of data content, and wherein at least some data content items of the plurality of data content items are unlabeled;
encoding the plurality of data content items with a feature representing a domain shift variation that is assumed to be present in the plurality of data content items, wherein the domain shift variation comprises a variation in a characteristic of the plurality of data content items, wherein an encoding technique performed on the plurality of data content items comprises at least one encoding technique of a plurality of encoding techniques including: histogram equalization, self-quotient image computation, image deconvolution, or local phase quantized codebook extraction, and wherein the encoding results in a plurality of simulated domains, each simulated domain of the plurality of simulated domains resulting from a different encoding technique of the plurality of encoding techniques being performed on the plurality of data content items and containing a different feature description corresponding to a feature extracted by the different encoding technique; and
clustering the plurality of data content items into a predefined number of content categories subsequent to the encoding, wherein at least one content category of the predefined number of content categories includes a subset of the plurality of data content items, and the subset of the plurality of data content items includes data content items acquired from at least two source domains of the plurality of different source domains, such that the clustering results in those of the data content items that belong to a same content category of the predefined number of content categories being clustered together regardless of which source domains of the plurality of different source domains those of the data content items are acquired from.

20. A non-transitory computer-readable storage medium storing instructions which, when executed by a processor, cause the processor to perform operations, the operations comprising:
acquiring a plurality of data content items originating from a plurality of different source domains, wherein each source domain of the plurality of different source domains comprises a different provider of data content, and wherein at least some data content items of the plurality of data content items are unlabeled;
encoding the plurality of data content items with a feature representing a domain shift variation that is assumed to be present in the plurality of data content items, wherein the domain shift variation comprises a variation in a characteristic of the plurality of data content items, wherein an encoding technique performed on the plurality of data content items comprises at least one encoding technique of a plurality of encoding techniques including: histogram equalization, self-quotient image computation, image deconvolution, or local phase quantized codebook extraction, and wherein the encoding results in a plurality of simulated domains, each simulated domain of the plurality of simulated domains resulting from a different encoding technique of the plurality of encoding techniques being performed on the plurality of data content items and containing a different feature description corresponding to a feature extracted by the different encoding technique; and
clustering the plurality of data content items into a predefined number of content categories subsequent to the encoding, wherein at least one content category of the predefined number of content categories includes a subset of the plurality of data content items, and the subset of the plurality of data content items includes data content items acquired from at least two source domains of the plurality of different source domains, such that the clustering results in those of the data content items that belong to a same content category of the predefined number of content categories being clustered together regardless of which source domains of the plurality of different source domains those of the data content items are acquired from.

* * * * *